US 6,541,986 B2

(12) United States Patent
Stein et al.

(10) Patent No.: US 6,541,986 B2
(45) Date of Patent: Apr. 1, 2003

(54) SENSOR FOR THE CAPACITIVE MEASUREMENT OF FILM WITH THICKNESSES

(75) Inventors: Markus Stein, Gevelsberg (DE); Stefan Konermann, Remscheid (DE)

(73) Assignee: Plast-Control Gerätebau GmbH, Remscheid (DE)

( * ) Notice: Subject to any disclaimer, the term of this patent is extended or adjusted under 35 U.S.C. 154(b) by 0 days.

(21) Appl. No.: 09/931,445

(22) Filed: Aug. 16, 2001

(65) Prior Publication Data
US 2002/0024345 A1 Feb. 28, 2002

(30) Foreign Application Priority Data
Aug. 24, 2000 (EP) .............................. 00118342

(51) Int. Cl.[7] .............................. G01R 27/26
(52) U.S. Cl. ............... 324/671; 324/674; 324/686; 324/662
(58) Field of Search .................. 324/671, 658, 324/662, 674, 686, 681, 701

(56) References Cited
U.S. PATENT DOCUMENTS 3,716,782 A    2/1973  Henry
3,764,899 A   10/1973  Peterson et al.
4,071,820 A *  1/1978  Mushinsky ............ 324/662
4,345,203 A    8/1982  Vermeiren et al.
4,451,780 A *  5/1984  Ogasawara ............ 324/662
4,471,295 A *  9/1984  Vermeiren ............. 324/671
4,968,947 A * 11/1990  Thorn .................. 324/701
5,378,994 A *  1/1995  Novak et al. ............ 173/4
5,917,328 A *  6/1999  Dimmick et al. ........ 324/662

FOREIGN PATENT DOCUMENTS

| EP | 0097570    | 1/1984  |
| GB | 2038483    | 7/1980  |
| JP | 63003202   | 1/1988  |
| WO | WO 8809912 | 12/1988 |

* cited by examiner

Primary Examiner—N. Le
Assistant Examiner—Anjan K. Deb
(74) Attorney, Agent, or Firm—Richard M. Goldberg

(57) ABSTRACT

A sensor for the capacitive measurement of film thicknesses, with a drum (10), which rolls along the film (12) and has at least one measuring capacitor (C1–C4), the plates of which are disposed in the peripheral surface of the drum (10), so that its capacitance is effected by the thickness of the firm, and with a transformer (26), for transmitting the measurement signal from the rotating drum (10) to the stationary part (28), where an oscillator (OSZ1–OSZ4), which is integrated in the drum (10), generates a frequency signal (24), which depends on the capacitance of the measuring capacitor (C1–C4).

15 Claims, 3 Drawing Sheets

SENSOR FOR THE CAPACITIVE MEASUREMENT OF FILM WITH THICKNESSES

BACKGROUND OF THE INVENTION

The invention relates to a sensor for the capacitive measurement of film thicknesses, with a drum, which rolls along the film and has at least one measuring capacitor, the plates of which are disposed in the peripheral surface of the drum, so that its capacitance is effected by the thickness of the film, and with a transformer, for transmitting the measurement signal from the rotating drum to a stationary part.

Such sensors are used particularly for measuring the thickness of blown films. The drum is then disposed in such a manner at the periphery of the film bubble, which is extruded from the extrusion die and inflated with inflating air, that it rolls along the film bubble, which is pulled off in the upward direction. The advantage over a stationary sensor consists therein that there is no friction between the measuring head and the film and therefore scratching of the film is avoided. If the sensor furthermore can be rotated about the vertical axis of the film bubble, the thickness profile of the whole periphery of the film bubble can be recorded during a complete revolution of the sensor. The thickness profile, so measured, can then be used, for example, to regulate the thickness of the film with the help of a cooling ring in a closed regulating circuit, which can be controlled segmentally and is described, for example, in EP-A-0478 641.

However, the spatial resolution of the thickness measurement is limited owing to the fact that only one measurement per revolution of the drum can be recorded with each measuring capacitor, since the measurement can be made only with the measuring capacitor in contact with the film. In order to achieve a high resolution, the periphery of the drum should therefore be as small as possible. On the other hand, however, the least size of the periphery of the drum is limited owing to the fact that the measuring capacitor must have a certain minimum size, so that an adequately accurate measurement signal is obtained.

U.S. Pat. No. 5,223,797 discloses a sensor of the type named above, the drum of which has two diametrically opposite measuring capacitors. The capacitor plates and the capacitor gap, formed between them are oriented at right angles to the axis of the drum. The opposite ends of the drum are mounted rotatably in a fork and the transformer for decoupling the measurement signal is formed by two sliding contact units, which are disposed at opposite ends of the drum and centered on the axis of the drum. One of the sliding contact units is connected with the respective positive plates of the measuring capacitors and the other sliding contact unit is connected with the negative or ground plates of the measuring capacitors. If a measuring capacitor moves past a film, the electrical edge field, formed between the capacitor plates, penetrates into the film material, so that the film acts as a dielectric and therefore the capacitance of the measuring capacitor is affected by the thickness of the film. With the help of the transformer, formed by the sliding contact units, the voltage, which depends on the capacitance of the measuring capacitor, is transferred to the fork and, from there, further to a stationary evaluating circuit. The fork, in turn, can be mounted rotatably, so that the drum can roll on a helical path relative to the film, while the measuring device revolves around the film bubble.

However, there is a problem with the known measuring device in that the effective capacitance of the measuring capacitors, and, with that, also the voltage, serving as a measurement signal, can easily be distorted by external influences, such as by stray electrical fields or by changes in the geometry of electrically conducting parts in the surroundings of the conducting connections between the measuring capacitors and the evaluating circuit. These interfering effects can be suppressed only inadequately by shielding measures.

Basically, in the case of capacitive measuring systems, it is known that an oscillating circuit can be built up with the help of the measuring capacitor and the intrinsic frequency of the oscillating circuit, which depends on the capacitance of the measuring capacitor, can be evaluated as a measurement signal. In this case, however, the problem exists that the intrinsic frequency of the oscillating circuit can also be distorted easily by external influences. Changes in the geometry of the electrical leads, forming the oscillating circuit, can also in this case easily lead to a distortion of the measurement signal.

DE-A-33 35 766 discloses a measuring device, with which the thickness of an electrically conductive coating of a tape can be measured. The tape is diverted at a drum, in the peripheral surface of which several capacitor plates are disposed offset in the peripheral direction and distributed over the length of the drum. The electrically conductive layer is on the side of the tape, averted from the surface of the drum, so that, with one of the capacitor plates, it forms a capacitor, the dielectric of which is formed by the tape itself With the help of a high frequency generator, alternating voltage is applied to the capacitor plates and the measurement signal is supplied to a transformer, which is accommodated in the drum, and transferred to there, for example, by wireless means, to a stationery part. With the help an angle transmitter, the respective angular position of the drum is determined, so that the measurement signal obtained by the transducer can be assigned to the individual capacitor plates and the profile of the layer thickness can thus be determined over the whole width of the tape.

However, the thickness of the layer does not affect the capacitance of the measuring capacitor. Rather, the principle of measurement is based upon the fact that the detuning of the measurement signal is determined by the electrical connectivity of the layer, which in turn, depends on the thickness of the layer. Accordingly, since the conductivity and not the capacitance is measured, the measuring device is relatively insensitive to external effects. However, this principle of measuring cannot be employed for measuring the thickness of non-conductive films.

SUMMARY OF THE INVENTION

It is an object of the invention to provide a sensor of the type named above, which makes possible a more accurate measurement of film thickness, and one which largely is not distorted by external effects, with a high special resolution.

Pursuant to the invention, this objective is accomplished by an oscillator, which is integrated in the drum and produces a frequency signal, which depends on the capacitance of the measuring capacitor.

Accordingly, pursuant to the invention, the oscillator and measuring capacitor form an oscillating circuit, the oscillating frequency of which depends on the capacitance of the measuring capacitor and, with that, on the thickness of the film in contact with this measuring capacitor. Since the oscillator is integrated in the drum, the geometry of the electrical leads forming the oscillating circuit is not changed by the rotation of the drum, so that the measurement signal is not distorted by the geometry of the leads. In addition, the leads forming the oscillating circuit, can be kept very short, so that the sensitivity of the oscillating circuit towards external noise signals and external damping is also decreased drastically. Since the measurement signal is a frequency signal, it is not affected either by static fields, which result, for example, from static charges. The measurement signal can be passed on directly as a frequency signal, optionally after a frequency conversion with the help of the transducer. Even if the transducer were to be exposed to external interfering effects, this would usually lead to hardly any distortion in the frequency of the measurement signal, so that finally, in the stationary part of the measurement arrangement, a largely undistorted signal is obtained. Alternatively, the measurement signal, before it is passed on to the transformer, can also be converted into a different signal, such as a voltage or current signal.

In this way, it is possible to carry out a sufficient sensitive and accurate thickness measurement with a measuring capacitor, which has relatively small dimensions. Accordingly, the drum can also have a relatively small periphery, so that a high spatial resolution of the measurement is achieved. The electronic components, required for producing the capacitance-dependent frequency signal, can be constructed small, for example, as integrated circuits, so that they can be accommodated in the drum without problems in spite of the small dimensions of the drum.

In a preferred embodiment, the drum contains several, for example four measuring capacitors, so that the spatial resolution correspondingly is quadrupled. Such a drum can be produced easily and rationally owing to the fact that the measuring capacitors are formed by strip conductors on a common multilayer plate, which is oriented at right angles to the axis of the drum. Electronic components integrated in the drum, can also then be disposed on this plate.

For this construction, the capacitor plates and the gaps formed between them extend in the peripheral direction of the drum. Their length in the peripheral direction of the drum is, however, preferable smaller than the length of arc, on which the film lies against the periphery of the drum. By these means, it is ensured that for each revolution of the drum, there is a sufficiently long period of time, during which the film lies in contact with the periphery of the drum over the whole length of the capacitor plates, so that distortion of the measurement signals due to incomplete contact between film and drum is avoided.

Preferably, the measuring device has an angle measuring device for measuring the angular portion of the drum and the individual measuring capacitors are controlled by means of the measured angular position so that, in each case, only that particular measuring capacitor is active, which happens to be in contact with the film. Mutual interference by the oscillating circuits is avoided so that at all times not more than one oscillating measurement circuit is active. An interference-free measurement is thus possible even when a relatively large number of measuring capacitors are accommodated on a relatively small periphery of the drum.

The angle-measuring device also offers the possibility of activating each measuring capacitor additionally during the short period, in which it is not in contact with the film and in which also none of the other measuring capacitors is active. The measurement signal obtained in this time can be used to calibrate the measuring capacitor in question. Since each measuring capacitor can be calibrated anew during each revolution of the drum, measurement errors, which arise out of the drift in the static capacitance of the measuring capacitor or out of mechanical or electrical changes in the sensor, can be eliminated continuously. The difference between the resting frequency of the measuring capacitor, measured in the calibration phase and the peak value of the frequency obtained during the actual measuring time, can then be evaluated as the measurement value. The temperature compensation, which continues to be necessary, is also simplified appreciably in this manner. It is sufficient to measure the temperature of each individual measuring capacitor or the temperature of the multilayer plate as a whole and to multiply the measured frequency difference by a correction factor, which represents the temperature-dependent change in the sensitivity, which is brought about by the changing distance between the plates. In the temperature range in question, this correction factor is almost a linear function of the temperature.

Preferably, the frequency signal, generated by the oscillator, is not transferred directly to the transformer; instead, it is first mixed with the frequency signal of a reference oscillator. The signal, finally passed on by the transformer, is then a low-frequency beat signal, which is not susceptible to interference and can be evaluated easily and the frequency of which corresponds to the difference between the frequency of the reference oscillator and the intrinsic frequency of the oscillating circuit, formed by the oscillator and the measuring capacitor.

Preferably, every measuring capacitor has its own oscillator assigned to it, the frequency signal of which is superimposed on the mixer only during the measuring phase.

In a particularly preferred embodiment, the capacitance-dependent frequency signal of the oscillator is coupled into the lead, which also supplies the oscillator with the operating DC voltage. Accordingly, the oscillator can be disconnected and, at the same time, the connection between the oscillator and the mixer cut by opening a single switch.

BRIEF DESCRIPTION OF THE DRAWINGS

In the following, an example of the invention is described in greater detail by means of the drawings in which.

DETAILED DESCRIPTION

Figure 1:
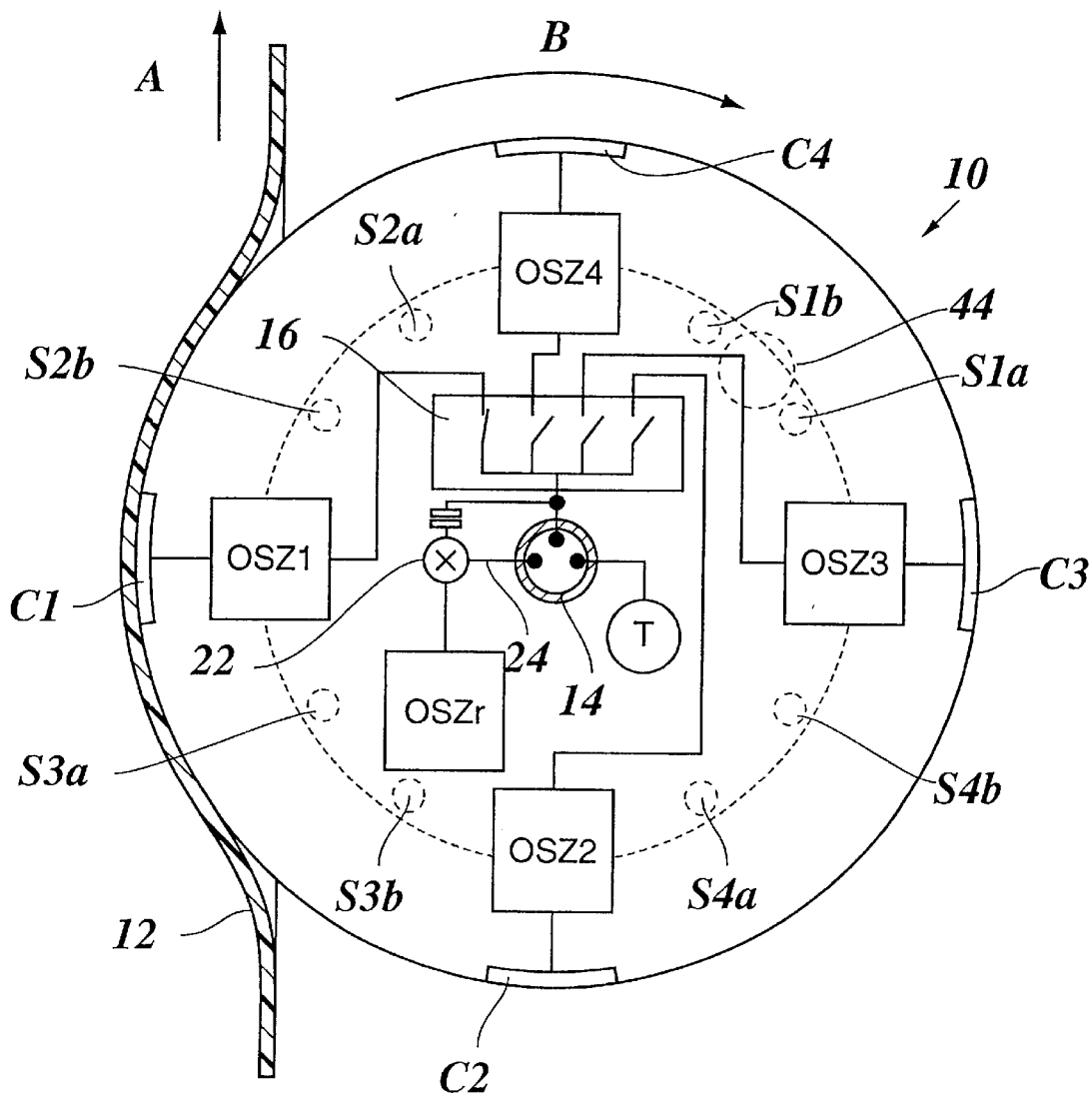
FIG. 1 shows a diagrammatic section through an essential part of the sensor.

In a diagrammatic cross section, FIG. 1 shows a drum 10 of a sensor, which is used for the capacitive measurement of the thickness of a film 12. The film 12, which is shown in section, is part of a film bubble, which is extruded in a blown film installation and pulled off upwards in the direction of arrow A. The drum 10 is fastened on a rotatable shaft 14, which is held, so that the periphery of the drum impresses the film bubble somewhat and the drum rolls along the film in the direction of arrow B. Since a slight overpressure is generated in the interior of the film bubble by the inflating air, the film 12 nestles against the periphery of the drum 10 over a certain length of arc.

At the peripheral surface of the drum 10, four measuring capacitors C1 to C4 are disposed, the capacitor plates of which are oriented parallel to the plane of the drawing in FIG. 1, so that only one of the capacitor plates of each measuring capacitor is visible. The outer edges of the capacitor plates lie directly in the peripheral surface of the drum 10. If a voltage is applied to the measuring capacitor, an electrical field is formed not only directly between the capacitor plates, but also at the edge of the capacitor plates outside of the capacitor. In the case of the measuring capacitor C1, which lies against film 12 in FIG. 1, this edge field permeates the film 12 over the whole of its thickness, so that the capacitance of this measuring capacitor is affected by the dielectric constant of the film material and accordingly depends on the thickness of the film 12.

Each measuring capacitor is connected electrically with an associated oscillator OSZ1 to OSZ4, which is supplied by a multiplexer selectively with an operating voltage (such as a DC voltage) over the shaft 14.

Figure 2:
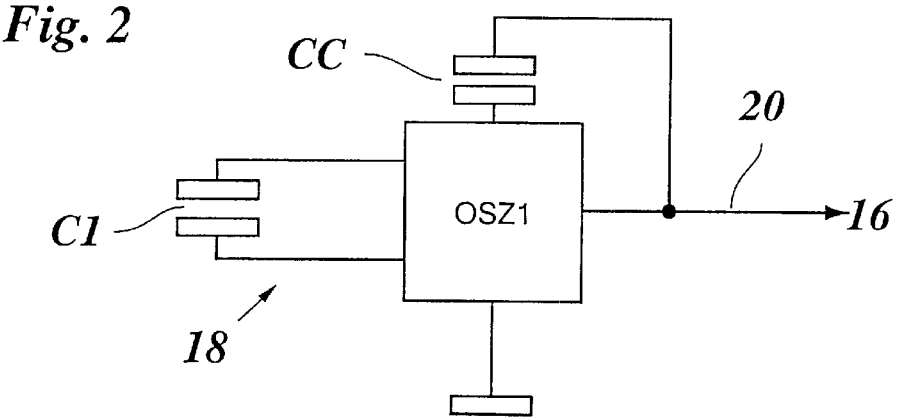
FIG. 2 shows a circuit diagram of a circuit formed by an oscillator and a measuring capacitor.

As shown in FIG. 2 by the example of the measuring capacitor C1 and the associated oscillator OSZ1, the measuring capacitors in each case form an oscillating circuit with the oscillator in question. With the help of the oscillator, this oscillating circuit 18 is caused to oscillate at its intrinsic frequency, which depends on the capacitance of the measuring capacitor and therefore on the thickness of the film 12. The oscillation of the oscillating circuit 18 is decoupled potential-free from the oscillating circuit, for example, with the help of a coupling capacitor CC and connected with a lead 20, which connects the oscillator OSZ1 with the multiplexer 16 and also supplies operating voltage to the oscillator.

FIG. 1 shows the multiplexer in the state, in which the oscillator OSZ1 is connected, while the remaining three oscillators are disconnected. The frequency signal, which was generated by the oscillator OSZ1 and decoupled with the help of the coupling capacitor CC, then reaches a mixer 22 over a further coupling capacitor and is mixed there with a reference signal, which is generated by a reference oscillator OSZr and has a fixed frequency. The mixer 22 is formed, for example, by an analog multiplexer with a low pass function and supplies a frequency signal 24, the frequency equal to the difference between the frequency of the reference oscillator OSZr and the intrinsic frequency of the oscillating circuit 18, to its output. This frequency signal 24 is supplied over the shaft 14 to a transformer 26, which is shown in FIG. 3, and thus is transmitted to the stationary part 28 for further evaluation.

The transformer 26 is formed by a slip ring drum, which is seated on the shaft 14, on which the drum 10 is held. A section of the shaft 14 between the transformer 26 and the drum 10 is held rotatably with the help of a bearing 30 at the end of an arm 32, which also carries the stationary part 28 and is pressed with the sensor, which is formed by the drum 10 and the transformer 26 against the film 12. In the example shown, the transformer 26 and the associated stationary part 28 are surrounded by a protective housing 34.

Figure 3:
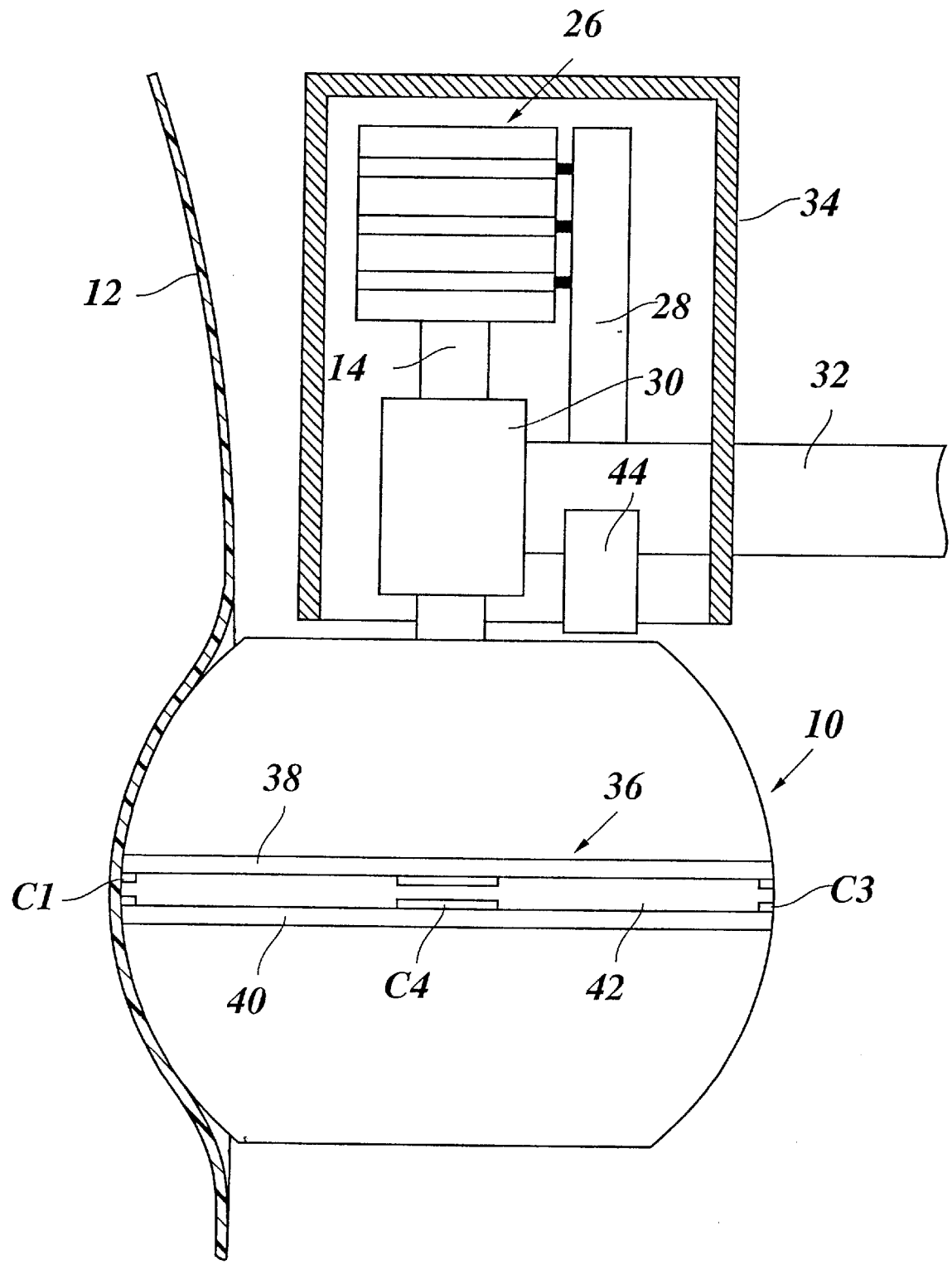
FIG. 3 shows the sensor of FIG. 1 in plan view.

As can be seen furthermore in FIG. 3, the drum 10 has a spherical peripheral surface, so that it does not damage the film 12. In the middle plane of the drum 10, that is, at the thickest part, a multilayer plate 36 is disposed, on which the electronic components, shown in FIG. 1, are mounted and which at the same time forms the measuring capacitors C1 to C4. The capacitor plates of the measuring capacitors are formed by track conductors on the mutually facing sides of at least two plates 38, 40, which, together with an insulating intermediate layer 42 (or several intermediate layers) form the multilayer plate 36.

Since the drum 10 warms up, when it rolls along the hot film bubble, the intermediate layer 42 is subject to a thermal expansion, which leads to a change in the distance between the plates of the measuring capacitors C1 to C4. This change in the distance between the plates distorts the frequency signals 24, which are obtained as measurement signals, so that an appropriate correction must be made when the frequencies of these frequency signals are converted into the thickness of the film 12. For this purpose, the drum has a temperature sensor T (FIG. 1), the temperature signal of which is also transmitted over the transformer 26. A third slip ring of the transformer 26 supplies an operating voltage to the electronic components accommodated in the drum 10.

The sensor furthermore includes an angle measuring device, with which the angular position of the drum 10 relative to the stationary part 28 and the arm 32 is measured, so that the oscillators OSZ1 to OSZ4, with the help of the multiplexer 16, can be connected and disconnected depending on the angle. In the example shown, the angle-measuring device is formed by a magnet head 44, which is held at the arm 32 and faces the front surface of the drum 10 and acts together with four pairs of magnetic switches S1a, S1b; S2a, S2b; S3a, S3b and S4a, S4b, which are disposed in the drum 10.

The magnetic switches are connected over leads, which are not shown, with the multiplexer 16 and control the functions of the latter. In the state shown in FIG. 1, the magnetic switch S1a has just passed by the magnet head 44. At the same time, the oscillator OSZ1 was connected on. When the magnetic switch S1b passes by the magnetic head 44, it is disconnected once again. As can be seen in FIG. 1, the length of the measuring capacitor C1 is clearly less in the peripheral direction than the length of the arc, on which the film 12 lies in contact with the drum 10. By these means, and establishing the connecting and disconnecting times with the help of the magnetic switches S1a and S1b, it is ensured that the thickness measurement with the help of the measuring capacitor C1 takes place only when the film 12 lies in contact with the whole length of the plate gap at the measuring capacitor. Any fluctuations in the depth of immersion of the drum 10 in the film bubble thus do not have an effect on the results of the measurement.

When the magnetic switch S1b has passed by the magnetic head 44 and immediately after the oscillator OSZ1 was disconnected, the next oscillator OSZ2 is connected for a brief time interval. During this time interval, the measuring capacitor C2 is still far removed from the film 12, so that its capacitance is not affected by the film. During this time interval, a frequency at rest can thus be measured, which represents the original capacitance of the measuring capacitor C2, which is not affected by the film. This frequency at rest is stored and later on, when the measuring capacitor C2 comes into contact with the film, is used to calibrate the measurement results. The periods of connection, disconnection and calibration of the remaining oscillators are controlled in an appropriate manner by the associated magnetic switches. In this manner, it is ensured that, during each complete revolution of the drum 10, four thickness measurements and four prepared calibrations measurements are carried out without any overlapping of the individual oscillators. With that, on the one hand, the thickness of the film 12, which is pulled off upward, can be measured at short intervals of time and, accordingly, with high spatial resolution while, on the other, the result of the measurement is not affected by interfering signals from the remaining oscillators, which do not participate in the measurement.

It is self evident that that angle transmitter, described above, can also be realized in a different way, for example, by contacts formed at the slip ring drum of the transformer.

Figure 4:
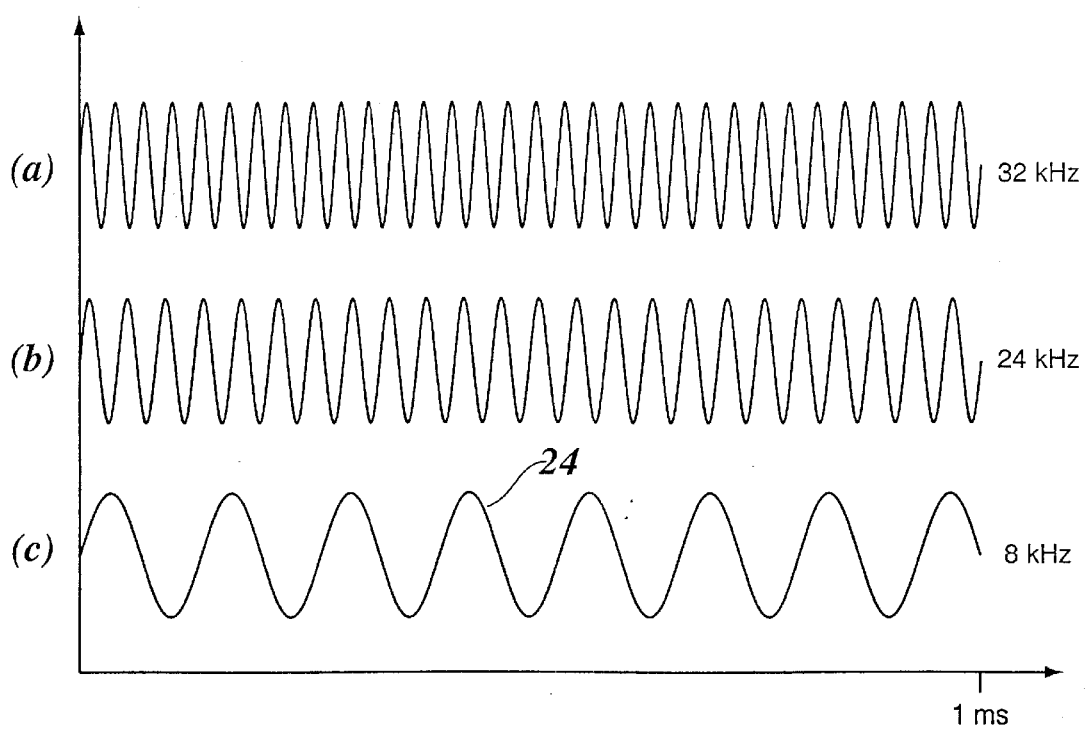
FIG. 4 shows the signal wave shapes for a calibration measurement and FIG. 5 shows signal wave shapes corresponding to FIG. 4, for a thickness measurement.

In FIG. 4, curve (a) shows the signal of the reference oscillator OSZr, which has a fixed frequency of 32 kHz in the example assumed here. The curve (b) shows the signal, which occurs in the oscillating circuit 18 during a calibration measurement, that is, in the absence of the film. It has a frequency, for example, of 24 kHz here. Curve (c) has the frequency signal 24, which is obtained by mixing the curves (a) and (b) of corresponding signals at the output of the mixer 22. This frequency signal 24 has a frequency of 8 kHz, corresponding to the difference between 32 kHz and 24 kHz. During the multiplication of the signals of curves (a) and (b), a further frequency component with the total frequency of 56 kHz is formed. However, this frequency component is eliminated by the low pass function of the mixer 22.

Figure 5:
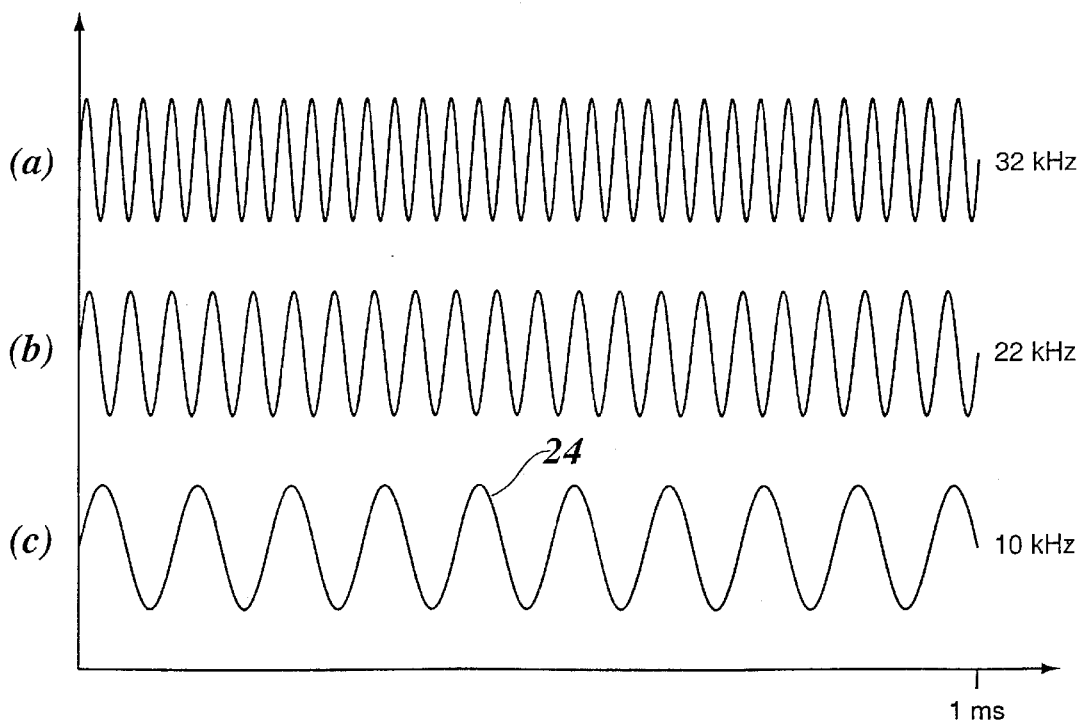

FIG. 5 shows the corresponding curves during a thickness measurement. Since the film 12 acts as a dielectric in this case, the measuring capacitor has a higher capacitance in this case, so that the intrinsic frequency of the oscillating circuit 18 increases more or less, depending on the thickness of the film, for example to 22 kHz. During the thickness measurement, the frequency of the frequency signal 24 thus is increased from 8 kHz to 10 kHz. The difference between 10 kHz and 8 kHz, namely 2 kHz (more precisely, the maximum of this difference during the measuring period), forms the crude measurement signal, from which the film thickness can be measured after the temperature correction. The numerical values of the frequencies, which are assumed here, are not realistic and are used only to illustrate the principle.

What is claimed is:

1. A sensor for the capacitive measurement of film thicknesses, comprising:
   a rotating drum which rolls along a film and has several measuring capacitors which are distributed in a circumferential direction of the drum, each measuring capacitor including plates of which are disposed in a peripheral surface of the drum, so that capacitance of each said measuring capacitor is effected by a thickness of the film, and each measuring capacitor has its own oscillator assigned to itself in such a manner, that geometry of an oscillating circuit, formed by the measuring capacitor and the respective oscillator, is the same for all measuring capacitors,
   a transmitter for transmitting a measurement signal from the rotating drum to a stationary part, and
   oscillators which are integrated in the drum and each of which generates a frequency signal which depends on the capacitance of the respective measuring capacitor.

2. The sensor of claim 1, further comprising a circuit which activates a measuring capacitor in a time period, in which said measuring capacitor is not in contact with the film, for a calibration measurement.

3. The sensor of claim 2, further comprising a circuit which activates and deactivates the measuring capacitors as a function of angular position of the drum in such a manner, that at most one of the measuring capacitors is active at any given time.

4. The sensor of claim 2, wherein an operating voltage of each oscillator is supplied and the frequency signal of each oscillator is put out on a common lead.

5. The sensor of claim 2, further comprising:
   a reference oscillator having a fixed reference frequency, and
   a mixer which mixes the reference frequency with the signal of each oscillator to produce a frequency signal which is passed on to the transmitter.

6. The sensor of claim 2, wherein the drum is mounted so that the film nestles against the peripheral surface of the drum over a certain length of arc and each measuring capacitor is dimensioned so that its length in a circumferential direction of the drum is less than a length of said arc.

7. The sensor of claim 2, wherein each measuring capacitor is constructed at an outer peripheral edge of a multilayer plate which is oriented at right angles to an axis of the drum.

8. The sensor of claim 1, further comprising a circuit which activates and deactivates the measuring capacitors as a function of angular position of the drum in such a manner, that at moat one of the measuring capacitors is active at any given time.

9. The sensor of claim 8, wherein the circuit which controls the activation and deactivation of the measuring capacitors includes a multiplexer which connects leads of the individual oscillators consecutively on the transmitter.

10. The sensor of claim 9, further comprising:
    a single reference oscillator and a single mixer connected selectively with the oscillators by the multiplexer.

11. The sensor of claim 1, wherein an operating voltage of each oscillator is supplied and the frequency signal of each oscillator is put out on a common lead.

12. The sensor of claim 1, wherein the drum is mounted so that the film nestles against the peripheral surface of the drum over a certain length of arc and each measuring capacitor is dimensioned so that its length in a circumferential direction of the drum is less than a length of said arc.

13. The sensor of claim 1, wherein each measuring capacitor is constructed at an outer peripheral edge of a multilayer plate which is oriented at right angles to an axis of the drum.

14. A sensor for the capacitive measurement of film thicknesses, comprising:
    a rotating drum which rolls along a film and has several measuring capacitors which are distributed in a circumferential direction of the drum, each measuring capacitor including plates of which are disposed in a peripheral surface of the drum, so that capacitance of each said measuring capacitor is effected by a thickness of the film, and each measuring capacitor has its own oscillator assigned to itself in such a manner, that geometry of an oscillating circuit, formed by the measuring capacitor and the respective oscillator, is the same for all measuring capacitors,
    a transmitter for transmitting a measurement signal from the rotating drum to a stationary part,
    oscillators which are integrated in the drum and each of which generates a frequency signal which depends on the capacitance of the respective measuring capacitor,
    a reference oscillator having a fixed reference frequency, and
    a mixer which mixes the reference frequency with the signal of each oscillator to produce a frequency signal which is passed on to the transmitter.

15. The sensor of claim 14, wherein the reference oscillator and mixer are connected selectively with the oscillators by a multiplexer.

* * * * *